(12) United States Patent
Boutant et al.

(10) Patent No.: US 8,943,325 B2
(45) Date of Patent: Jan. 27, 2015

(54) USE OF A DIGITAL SIGNATURE OBTAINED FROM AT LEAST ONE STRUCTURAL CHARACTERISTIC OF A MATERIAL ELEMENT TO PROTECT THE DIRECT READING OF SENSITIVE DATA AND METHOD FOR READING THIS PROTECTED DATA

(75) Inventors: Yann Boutant, Aix-les-Bains (FR); David Labelle, Soucieu en Jarrest (FR); Herve Seux, Lexington, MA (US)

(73) Assignee: Signoptic Technologies Savoie Technolac, Le Bourget du Lac (FR)

( * ) Notice: Subject to any disclaimer, the term of this patent is extended or adjusted under 35 U.S.C. 154(b) by 1042 days.

(21) Appl. No.: 11/050,700

(22) Filed: Feb. 7, 2005

(65) Prior Publication Data

US 2005/0262350 A1 Nov. 24, 2005

Related U.S. Application Data

(60) Provisional application No. 60/559,430, filed on Apr. 6, 2004.

(30) Foreign Application Priority Data

Feb. 6, 2004 (FR) ..................... 04 01171

(51) Int. Cl.
G06F 21/00 (2013.01)
G06F 21/62 (2013.01)
G06K 9/00 (2006.01)
H04L 9/32 (2006.01)

(52) U.S. Cl.
CPC ........ *G06F 21/6209* (2013.01); *G06K 9/00577* (2013.01); *H04L 9/3247* (2013.01); *G06F 2221/2107* (2013.01); *H04L 2209/805* (2013.01)
USPC .......................................................... 713/180

(58) Field of Classification Search
USPC .......................................................... 713/180
See application file for complete search history.

(56) References Cited

U.S. PATENT DOCUMENTS

| 1,686,585 A | 10/1925 | Vernam |
| 3,636,318 A | 1/1972 | Lindstrom et al. |
| 4,114,032 A | 9/1978 | Brosow et al. |
| 4,218,674 A | 8/1980 | Brosow et al. |

(Continued)

FOREIGN PATENT DOCUMENTS

| CN | 1430175 | 7/2003 |
| EP | 0570162 | 11/1993 |

(Continued)

OTHER PUBLICATIONS

Handbook of Applied Cryptography Alfred J. Menezes, Paul C. van Oorschot and Scott A. Vanstone CRC Press ISBN: 0-8493-8523-7 Oct. 1996, Chapter 1 and 7.*

(Continued)

*Primary Examiner* — Bradley Holder
*Assistant Examiner* — James Turchen
(74) *Attorney, Agent, or Firm* — Clark & Brody

(57) ABSTRACT

The invention is related to the use of one or several digital signatures obtained from at least one structural characteristic of a material element that has a complex, chaotic, unique and stable structure, to protect the direct reading of sensitive data, a media of such protected data and a method for reading this protected data.

56 Claims, 4 Drawing Sheets

(56) References Cited

U.S. PATENT DOCUMENTS

| | | | |
|---|---|---|---|
| 4,423,415 A | | 12/1983 | Goldman |
| 4,682,794 A | | 7/1987 | Margolin |
| 4,738,473 A | | 4/1988 | Meloni et al. |
| 4,820,912 A | | 4/1989 | Samyn |
| 5,089,712 A | * | 2/1992 | Holland ............... 250/557 |
| 5,354,097 A | | 10/1994 | Tel |
| 5,412,718 A | * | 5/1995 | Narasimhalu et al. ....... 705/51 |
| 5,509,692 A | | 4/1996 | Oz |
| 5,576,825 A | * | 11/1996 | Nakajima et al. ........... 356/71 |
| 5,581,257 A | * | 12/1996 | Greene et al. ............. 342/51 |
| 5,719,939 A | | 2/1998 | Tel |
| 5,790,025 A | * | 8/1998 | Amer et al. ............. 340/571 |
| 5,870,469 A | | 2/1999 | Albert et al. |
| 5,903,340 A | * | 5/1999 | Lawandy et al. ........... 356/71 |
| 6,135,355 A | | 10/2000 | Han et al. |
| 6,357,656 B1 | | 3/2002 | Puff |
| 6,535,618 B1 | * | 3/2003 | Rhoads ............... 382/100 |
| 6,565,002 B1 | | 5/2003 | Tel |
| 6,584,214 B1 | | 6/2003 | Pappu et al. |
| 6,588,672 B1 | | 7/2003 | Usami |
| 6,925,192 B2 | * | 8/2005 | Honsinger et al. ........ 382/100 |
| 7,028,188 B1 | * | 4/2006 | Moore ................. 713/176 |
| 7,089,420 B1 | * | 8/2006 | Durst et al. ............ 713/176 |
| 7,188,258 B1 | * | 3/2007 | Aggarwal et al. ......... 713/194 |
| 7,991,157 B2 | * | 8/2011 | Rhoads ................ 380/247 |
| 8,171,567 B1 | * | 5/2012 | Fraser et al. ............ 726/32 |
| 2003/0138128 A1 | | 7/2003 | Rhoads |
| 2005/0257064 A1 | | 11/2005 | Boutant et al. |
| 2006/0002550 A1 | * | 1/2006 | Campagna et al. ......... 380/46 |

FOREIGN PATENT DOCUMENTS

| | | |
|---|---|---|
| EP | 0 583 709 | 2/1994 |
| EP | 0682328 | 11/1995 |
| EP | 1 139 302 A1 | 10/2001 |
| EP | 1202225 | 5/2002 |
| EP | 1239413 | 9/2002 |
| FR | 2 778 483 | 5/1998 |
| FR | 2804783 | 8/2001 |
| FR | 2848318 | 6/2004 |
| JP | 11-212454 | 8/1999 |
| JP | 2003-345930 | 12/2003 |
| WO | 01/43086 | 6/2001 |
| WO | 01/91007 | 11/2001 |
| WO | WO03/052701 | 6/2003 |

OTHER PUBLICATIONS

Physical One-way Functions Pappu Ravikanth Sep. 20, 2002 Sciencemag.*

Biometrics: A Grand Challenge, Jain et al., Proceedings of the 17th International Conference on Pattern Recognition (ICPR'04).*

Error-Tolerant Password Recovery, Frykholm et al, CCS'01, Nov. 5-8, 2001.*

Biometrics: A Grand Challenge; Jain et al.; Proceedings of the 17th International Conference on Pattern Recognition (ICPR'04).*

Error-Tolerant Password Recovery; Frykholm et al.; CCS'01, Nov. 5-8, 2001, Philadelphia, Pennsylvania, USA.*

J. Douglass, "The Vernam One-Time Pad System, and Some Technical Notes on the "Secure" Vernam Pseudorandom Keystream Generator", Copyright 1996, pp. 1-15.

S. Tsuji et al., "Cipher and Information Security", 156-158, Mar. 28, 1990.

* cited by examiner

USE OF A DIGITAL SIGNATURE OBTAINED FROM AT LEAST ONE STRUCTURAL CHARACTERISTIC OF A MATERIAL ELEMENT TO PROTECT THE DIRECT READING OF SENSITIVE DATA AND METHOD FOR READING THIS PROTECTED DATA

This application claims priority under 35 USC §119(e) of U.S. Provisional Application No. 60/559,430 filed Apr. 6, 2004.

FIELD OF THE INVENTION

The invention relates to the technical field of protecting and securing data. The purpose of the invention is notably the use of one or several digital signatures of a material element which has a complex, chaotic, unique and stable structure, to protect the direct reading of sensitive data, a media of such protected data and a method for reading this protected data.

BACKGROUND OF THE INVENTION

The coming of the digital age has brought new development opportunities to organisations and individuals. If the digital world has created much faster, easier and more pertinent access to information and communications in all its forms, it has revolutionised the functions of storing and transmitting information, we can also consider that, intrinsically, digital platforms, in general networks, allow to reproduce, the sending and capturing of information, and often in an uncontrollable manner.

The digital world is thus intrinsically unsuited to fulfilling the functions of authentication, of protection/securing of data (confidentiality), of data follow-up (traceability and integrity). . . .

Whole areas of technology have been developed to overcome these original defects (antivirus, firewall, cryptography, steganography, access control . . . ). Solutions are essentially based around algorithmic or programming principles to bring these new unnatural dimensions to the digital world.

BRIEF SUMMARY OF THE INVENTION

With this in mind, the purpose of the invention is to propose a new global method of securing sensitive data, that meaning what we wish to protect, control direct access to or check the integrity of, as well as a method for reading the protected data obtained, with a high level of reliability. This method normally has the advantage of not basing its safety on mathematical and/or algorithmic conjecture.

This method is to be used to protect all types of graphic, digital, static, dynamic and analogic data.

The invention also has the purpose of proposing a new means for infinitely generating sequences on an entirely random basis.

This new method is to provide new, complementary and very efficient solutions for applications as varied as:
 the traceability of products and activities with a high level of security,
 documentary management, including time stamping and geo-localisation (GPS),
 security documents (trustee, cash value, ID, medical, patents . . . ),
 the securing of data and exchanges (communications),
 embedded or non-embedded tabs,
 all types of packaging (including intelligent and RFID),
 the confidentiality of physical documents or digital data,
 access control (to zones, machines, activities, money and data) and multipurpose cards,
 electronic voting,
 games of chance,
 the fight against forging of manufactured products or intellectual and artistic work,
 the original certifying of paper or electronic documents (electronic signature),
 electronic payment including "virtual ticketing" and franking),
 the protecting of cryptographic keys using standard protocols.

Therefore, the purpose of the invention is the use of at least a digital signature obtained from at least one structural characteristic of a material element chosen from among all or part of a fibrous material, plastic, metal, leather, wood, composite material, glass, mineral, crystalline structure, to protect the direct reading of sensitive data in digital form, by subjecting the sensitive data in digital form to a digital processing which implements the digital signature(s).

Another purpose of the invention is the use of material elements chosen from among all or part of a fibrous material, plastic, metal, leather, wood, composite material, glass, mineral, crystalline structure, to generate random sequences or random encoding keys, in the form of digital signatures obtained from at least one structural characteristic of the material element from which it is extracted.

Yet another purpose of the invention is a method for reading protected sensitive data, the reading being performed by subjecting the protected sensitive data in digital form to a digital processing which implements one or several digital signatures obtained from at least one structural characteristic of a material element chosen from among all or part of a fibrous material, plastic, metal, leather, wood, composite material, glass, mineral, crystalline structure.

Other objects of the invention are the methods, uses and processes as defined in the claims.

The following description, in reference to the annexed figures, provides better understanding of the purpose of the invention.

BRIEF DISCRIPTION OF THE DRAWINGS

DETAILED DISCRIPTION OF THE INVENTION

Figure 1:
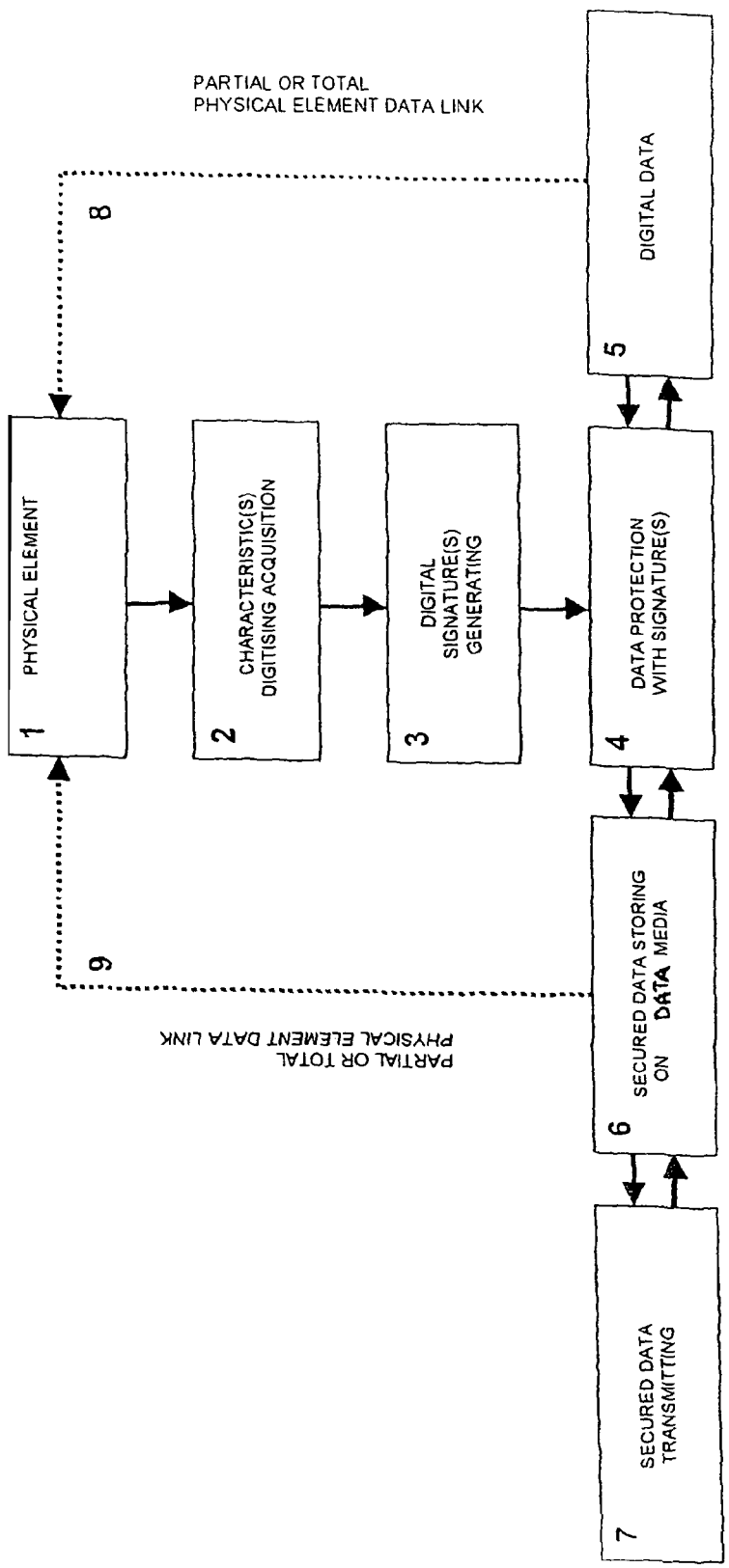
FIG. 1 represents an overall diagram including a method for protecting and a method for reading according to the invention.

The processes, methods and uses of the invention implement at least a digital signature generated from a material element. These digital signatures are obtained from at least one structural characteristic of a material element selected for its structural characteristics. So, all the methods, processes, uses according to the invention include a step of detection of at least one structural characteristic of a material element, in order to generate at least one digital signature. The material used in the invention presents a complex, chaotic, unique and stable structure. In a usual meaning, "digital signature" of a material element refers to a numeric representation, a numeric characterization which is peculiar to its. According to the invention, a digital signature is extracted from the structure of the material element; it is obtained from at least one characteristic of the material element reflecting its structure. In particular, the digital signature presents a random character. The digital signatures can for instance be a digital image of the structure of the material element, as illustrates FIG. 2.

The invention uses the physical, analogue and material world which possesses, in various forms, unique elements, generally resulting from a chaotic and/or stochastic method of creating. Indeed, some material elements contain rather chaotic characteristics and have an extremely intrinsic, complex structure, providing a considerable wealth of information for those who know how to read it.

Usually, the material elements selected to implement the invention unite characteristics that are both deterministic and random. In the scope of the invention, it is particularly advantageous to extract the random part as best as possible. These material elements will generally also be non-copiable/non-reproducible.

Moreover, some material elements have a practically invariable structure in a given time, which allows to preserve them and use them during this period. The present invention uses material elements whose structure is complex, unique, chaotic and practically invariable with time. As suitable materials for the invention, we can cite, in particular, fibrous materials, plastics, metals, leather, wood, composite materials, glass, minerals, crystalline structures, which may have been altered or transformed. They can, for example, be printed and/or engraved and/or perforated. A combination of several materials can also be used as material element according to the invention. The fibrous materials, natural or synthetic fibre based, and in particular partially or fully of paper, cardboard or nonwoven are preferred. Therefore, the invention advantageously turns to manufactured materials. We can also envisage that the material element incorporates a paper, cardboard or nonwoven, on to which it is marked out by a transparent material with the detection mode used to extract the structural characteristic(s), stable with time and ensuring its protection, for example, a plastic or resin coating.

The material element used in the invention can already exist, be manufactured or even altered, for the sole purpose of being implemented in the method according to the invention.

Preferably, we use the paper as material element at the origin of the digital signature(s) to ensure the protection of the sensitive data, according to the invention. Indeed, the paper is an extremely complex and porous material essentially constituted of cellulosic fibres and mineral filled. It is anisotropic and heterogeneous. The fibres are oriented and gathered in agglomerate: flocks.

The "natural" instability of the physical chemical method of manufacturing, the intrinsic variation of the raw material employed here explains the high chaotic composition of the structure of the paper. The forming of the structure of this material is made by depositing a flow of pulp on a screen (a forming fabric). Its formation factor is noticeable by the naked eye in look through with natural light: it is called "sheet formation". The paper is usually made in strips and shaped into sheets. It can be scanned in a variety of ways and for instance, structural characteristics showing its surface condition, internal porosity, volume organisation of the microscopic or macroscopic fibre network (flocks) at various scales, can be detected.

The paper gathers the generic properties needed to be used as random digital signature generating material element, that is to say the high complexity of its structure, the chaotic aspect (unpredictable) with different scales, the uniqueness of each part of the paper, and its practically invariability with time (slow ageing notably of its structure, allowing to preserve paper for decades, even centuries . . . ).

The wealth of the invention becomes evident when a material element is used which, among other properties, has those of quasi invariability. Naturally that meaning, that it does not alter at all or very little with time, and that if we read certain structural characteristics at a given time, we are capable of finding these characteristics fully intact or in a very similar state at a later time. It can therefore be qualified as stable. This stability can be obtained by protecting the material element from possible external attacks (scratches, perforations, optical damage . . . ). This protection can be done by definitively inserting the material element in an external envelope, without hindering access to the beneficial characteristics of the material element. It can also be made by keeping the material element preserved from attacks in a controlled atmosphere and/or under physical protection, that being in a safe place. The type of protection given to the material element depends on the chosen application (frequent or infrequent use of the material element, sensitivity of the application . . . )

The digital signatures obtained from at least one structural characteristic of a material element, as previously defined, may be obtained as follows. We choose a physical element, according to the invention, and we extract one or several structural characteristics, which are practically invariable with time. Advantageously, these structural characteristics reflect the chaotic, complex, unique and stable structure of the material element. In other words, one or several complex and chaotic characteristics are extracted from the unique structure of the material element. These characteristics will be used to generate, after joint or individual digitisation with other processes of shaping/conditioning and/or encoding type, a digital signature. This digital signature, which itself reflects the chaotic, complex, unique and stable structure of the chosen material element, will then be implemented to ensure the protection, the securing, of all types of sensitive data in digital form, that being in order to prevent direct reading. It will therefore sometimes be necessary to digitise the sensitive data to be protected beforehand if it is not already in digital form. In a usual way, the expression digital means a representation of data or physical units in the form of all types of signals (including real or complex images, amplitude and/or phase components) with discrete values, for example in the form of figures (irrespective of the base: binary, decimal, hexadecimal . . . ) or in the form of any given set of symbols (alphabet, predefined grammar . . . ). Digital systems often use analogue to digital and digital to analogue converters.

FIG. 1 illustrates, in a general manner, a method for protecting and a method for reading according to the invention. The method for protecting comprises the following stages:

1. A physical element according to the invention is chosen.
2. The acquiring and the shaping/conditioning even digitising of one or several characteristics of the material element is performed thanks to one or several sensors with or without contact with the material element. These sensors are normally followed by an analogue (optical or electronic, for example) or digital (capture board wired into any given computer or automatic platform) run unit.
3. One or several digital signature(s) are generated from characteristics extracted and shaped/conditioned from stage 2. Encoding (in analogue and/or digital form) can be performed followed or preceded by digitisation if the characteristics extracted from stage 2 are not already in digital form, the nature of these processes can vary depending on the type of chosen material element and the application for which the method is implemented.

4. The digital signature(s) are associated, either directly (via elementary mathematical operations) or indirectly (via sophisticated cryptographic algorithms and/or steganography for example), with sensitive digital data, so as to ensure the protecting of it.

For the protection of data in digital form, the invention implements a digital process using at least one digital signature derived from a material element, which allows to render the original sensitive data indirectly accessible, readable, audible. . . . In other words, we understand that the sensitive data is secured, their readability or understanding requires implementing a subsequent method for reading which constitutes another of the aspects of the invention.

Optionally, the sensitive data can be partly or entirely physically connected to the material element implemented in stage 1: it can, for example, be printed on a document from which the material element issued.

The secured data in stage 4 are stored (stage 6) on a data medium (digital, optical, magnetic, electronic, paper, notably via engraving, printing, recording. . . ). The storing can be a temporary or permanent recording. The material element implemented in stage 1, can constitute a part of this medium. Furthermore, according to stage 7, all or part of the protected data in stage 4 can be transmitted, via a telecommunications network (optic fibres, radio waves, telephone, satellite. . .) or a means of transport in a material form. The sensitive data being protected thanks to the digital signature(s) extracted from the material element, they can not be subsequently accessed by anyone who does not have the initial material element and the encoding algorithms to generate the digital signatures and/or said digital signatures and their implementing algorithms. The sensitive data, once protected, is at least partially illegible. This method for reading will be described later on.

There are various means of obtaining a digital signature from at least one structural characteristic of a material element. The best suitable digital signatures for the uses and processes according to the invention present a complex and chaotic character that mirrors the structure of the material from which they are extracted. This signature is, advantageously, obtained via detection, using one or several sensors, of one or several structural characteristics of this element, which are practically invariable with time, reflecting its complex, chaotic, unique and stable structure, possibly followed by a shaping/conditioning, digitising and an encoding according to one or several algorithms of this or these structural characteristic(s). The expression algorithm means a set series of operating rules or elementary processing stages to obtain a result from initial data or signals, such as, for example, computing algorithms (digital meaning of the expression) or optical/electronic elementary processes (analogue meaning of the expression).

Furthermore, the acquiring of the structural characteristics can be done in analogue or digital form. If the acquiring is done in analogue form, we can either digitise then encode in digital form to obtain the digital signature, or encode in analogue form then digitise to obtain the digital signature. The earliest digitising can take place is in stage 2 of FIG. 1 or it can be the last operation performed in stage 3 of FIG. L. We can therefore use, for example, the following sequences:

a—Sensor/digital processing unit (capture board wired into a computer platform)/Digital Encoder
    b—Sensor/analogue processing unit (Conditioning of the signal)/Analogue to Digital Converter/Digital Encoder
    c—Sensor/analogue processing unit (shaping/conditioning of the signal and Encoding)/Analogue to Digital Converter It is also possible to use, in stages 2 and/or 3, Analogue to Digital or Digital to Analogue Converters in order to carry out some special processes whilst remaining within the scope of the invention, the important factor at the end of stage 3 is to obtain the digital signatures.

Furthermore, the structural characteristic(s), and therefore the digital signature, advantageously reflects the internal structure of the material element, so that the structural characteristic(s) is measured over a volume of media and on the inside of the latter.

Detection can be performed according to the non-contact methods (notably optical and/or electromagnetic), in which we use the interaction (reflection and/or absorption and/or transmission and/or diffusion and/or refraction and/or diffraction and/or interference) of a wave or electromagnetic radiation with a material element, and we use an optical/electromagnetic sensor to perform the acquisition, even the digitisation. The implemented sensor(s) can then be placed in any position in relation to the detected material element, and in relation to the radiation source(s). Usually, the employed radiation can be visible light and/or infrared (IR) and/or ultra-violet (UV) and/or laser or beta, gamma or X rays. The choice of radiation and sensors employed can be influenced by applying the method, the type of material element chosen, the measuring scale chosen, the implementation costs . . . the sensor(s) employed can be fixed in relation to the source and/or the material element, or in relative movement. It is also possible to measure the interactivity between the wave and the material according to several orientations.

Advantageously, the methods and uses according to the invention, implement the digital signature of a material element, issued from paper, cardboard or nonwoven, obtained after detection of its interactivity with visible light, via look through, by using a CCD or CMOS sensor among others.

Detection can also be performed according to methods with contact between the material element and the measuring unit. A feeler, for example, is used as sensor. This feeler can or cannot integrate, in addition to the mechanical dimension (monitoring of the surface roughness), electromagnetic dimensions (magnetic behaviour) or others. In which case, a relative movement of the feeler and of the material element is required.

Another example of a contact sensor consists in using the material element as media of an ultrasonic wave, for example, or any other applied stress (electric, thermal, chemical, biological . . . ). We then record, in different orientations, the behaviour/reply of the material element subject to this wave or stress.

The extracting of structural characteristics of the material element can also be performed at one or several scales, at microscopic or macroscopic level, thus determining the complexity of the measured structural characteristic. The complexity of the characteristic defines that of the digital signature, chosen in the case of protection via direct combination, depending on the size of the sensitive data to be protected. If we reconsider the example of a paper type material element, we can scrutinise its structure obtained via look-through, or the roughness of its surface, in respect to the fibres (elements from 100 µm to a few mm in length and about 10 to 20 µm in width), or in respect to the fibre aggregates (usually about 1 to 10 mm).

The surface of a metal can also be perfectly smooth to the eye and become very rough, and therefore of interest as a material element in the scope of this invention, when observed on a micronic or sub-micronic scale.

Figure 2:
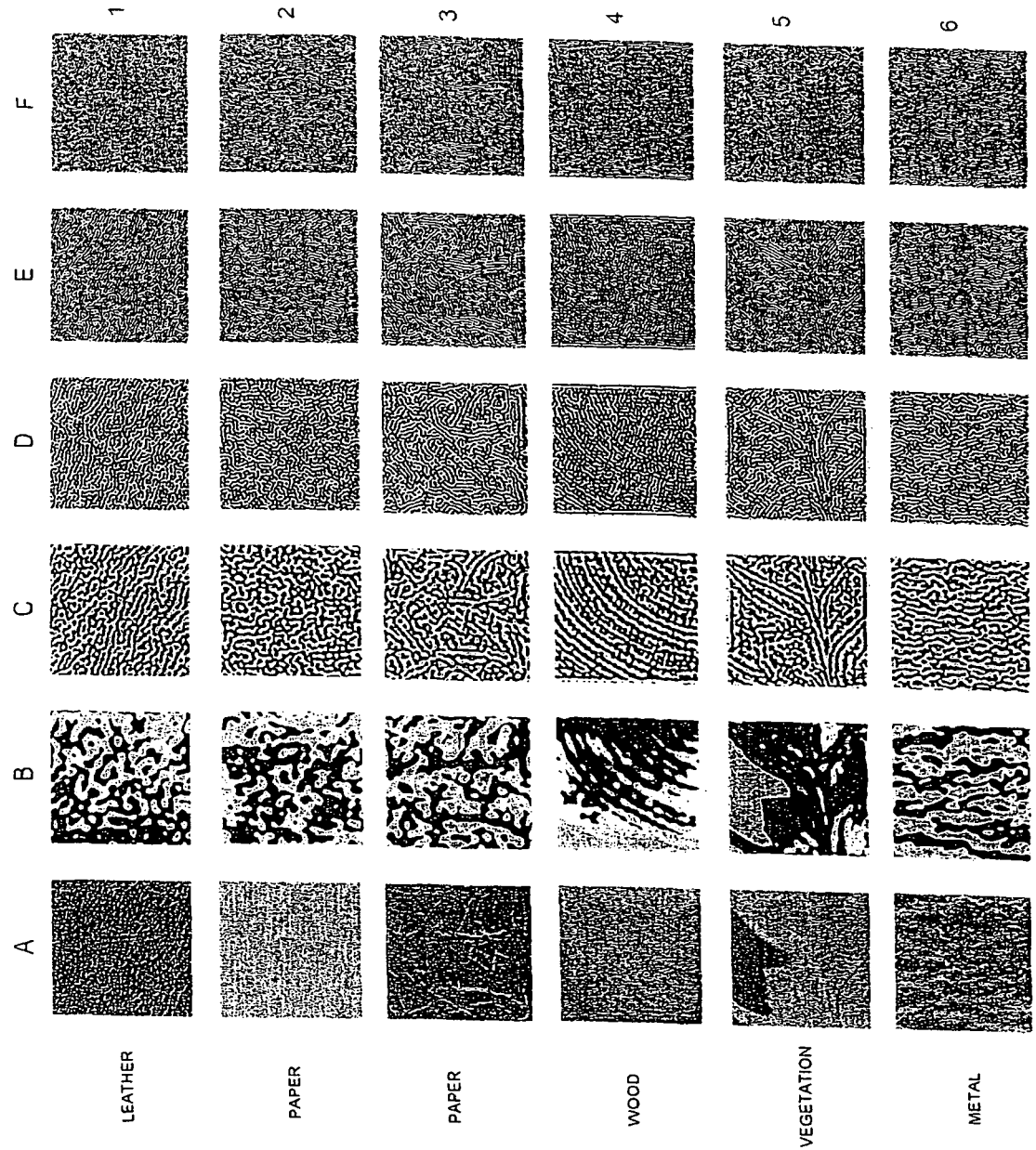
FIG. 2 illustrates various means of obtaining digital signatures from different material elements.

Wood is another example, as we can follow the veins of the material with the naked eye, but the innermost structure of this material is only accessible at a scale of 50 to 100 μm. FIG. 2 illustrates digital signatures that can be obtained from these different materials, depending on the filters used.

Detection, on the material element, of a structural characteristic reflecting its unique complex structure, can be performed by scanning the element according to a line (1D), according to a surface (2D), or according to a volume (3D Stereoscopy), so that after digitisation, the structural characteristic is in the form of 1D, 2D or 3D. Advantageously, the digital signature(s) used reflect(s) the internal structure of the fibrous material and will therefore be obtained by observing the internal and possibly surface characteristics on a volume of the latter. Detection can also be performed independent of time or "in real time". In the case of the latter, the structural characteristic is, sampled with time.

Likewise, we can add dimensions to this stage of detection, by observing the material element under different orientations or illuminations, in colour, shades of grey, in binary form. The image under study can also be a discrete or indiscrete image, real or complex (amplitude and phase) in respects to the processing and analysing of the image.

The digital signature(s) implemented in the method of the invention correspond to such a digitised structural characteristic, possibly subjected to encoding (before or after digitising) according to one or several algorithms. Also, such a digital signature has, for example, a binary form, the form of one or several images in colour or shades of grey, of one or several discrete, real or complex images (amplitude and phase).

Obviously, the wealth of the invention becomes particularly interesting by using one or several digital signatures that keep the random and complex character representative of the unique and stable structure of the material. That means that, after the process applied to the structural characteristic(s) used to generate the digital signature, the digital signature will remain random and complex.

To generate one or several digital signatures from the characteristics, there are a number of conceivable methods, and it would be unreasonable to try and cite all of them. Therefore, the techniques described below in no way constitute an exhaustive list.

Of course, the known methods of signal and image processing and analysis, of electronics and optics, can be used directly. The processing then used in digital or analogue form can be based on spatial and/or frequency filters (high-pass, low-pass, band-pass . . . ) and/or the Fourier transform, and/or so-called wavelets transforms, and/or descriptors, and more generally, all types of algorithms allowing to analyse and/or transform and/or reorganise and/or classify and/or threshold the unprocessed data (including signals and images) extracted from the structural characteristic(s). The convolution/deconvolution operations as well as the logical and arithmetic operations between images and/or signals can be implemented to obtain said signatures. By way of example, the Fourier transform of a signal/image can be implemented, either by means of a Fast Fourier Transform (FFT) if the signal is discrete or by means of a Fourier lens if the signal is optical.

To the structural characteristics extracted from the material element we can also apply more elaborated algorithms, such as those evoked above so that the final digital signature(s) have the form of a signal, an image, any type of file that can be coded in alphanumeric or digital form in decimal, binary, octal, hexadecimal, or other base.

The stage of protecting sensitive data can implement one or several digital signatures extracted from the same material element or from different material elements.

The stage of protecting sensitive data in digital form, by means of the thus generated digitised signature(s), can be performed, as explained above, directly via elementary mathematical operations or indirectly using already elaborated algorithms, for example of cryptography and/or steganography, with or without prior data compression.

In the direct means, the protection of sensitive data in digital form is performed by combining at least one digital signature of a material element, rendering both the sensitive data in digital form and the digital signature at least partially illegible.

By way of example, we can cite the combining of a digital signature in binary form (sequence of "0" and of "1", image of the chaotic structure of the material element), with the sensitive data in coded digital form, itself in binary form, by performing a logical operation (XOR (modulo-2 addition), for example) between the two binary sequences, bit by bit. The two binary sequences ideally being the same size. The digital signature and the digital data to be protected can also be combined by adding, octet by octet, the two digital chains. Here again, a variety of combinations are possible remaining within the scope of the invention. The combination can be made from the binary, hexadecimal, ASCII or alphabetic form of the sensitive data in digital form and of the digital signature (s) of the material element, by jointly or singly applying the principles of permutation, transposition, substitution, iteration, mask (logical operators including XOR, addition, subtraction, bit by bit (in sequence) or block by block . . . ) or mathematical properties of modular algebra (modulo n) and of numbers theory.

A more elaborate form of combination uses the principle of disposable mask (One-Time Pad). The digital signature used is a perfect random sequence, of the same size as the sensitive data in digital form (in number of bits, for example) and acts as a mask but only once. By extension, we can also envisage using a digital signature greater than or equal to that of the sensitive data. Moreover, it is to be noted that it is possible to combine all types of sensitive data, irrespective of its size, given the practically invariable reserve that constitutes the eligible material elements.

The protecting of only a part of the sensitive data is entirely conceivable, by simply choosing, from the digital data, the zones to be combined with the digital signature.

The indirect means for securing the digital data implements the digital signature(s) of the material element and the cryptographic (with private key and/or public key) and/or steganographic algorithms. The digital signatures play the role of cryptographic key, steganographic key, password, pass phrase, pass file, random seed, random encoding keys or can simply be implemented as "digital envelop" of compressed, cyphered and/or steganographed digital data. We then have a more complex method for protecting: the sensitive data can be protected according to known methods (combination, cryptographic algorithm), then subjected to the method for protecting according to the invention or inversely. When the method for protecting according to the invention takes place in the final phase, we can consider that the digital signature plays the role of digital envelop.

If the secret key applications are naturally usable with the method related to the invention, we can then, in a more elaborate version of the invention, use existing protocols of asymmetric (public/private) keys by using one or several digital signatures extracted from the material element as cryptographic key. By way of example, we can extract two large prime numbers (intrinsically random selection but rooted in the material element, hence reproducible for those who posses the physical key) from the material element which will be used to implement a RSA (Rivest-Shamir-Adleman) type method, or use for example a random selection extracted from the material element in a given cryptographic protocol. More generally speaking, we can also extract a public key and a private key from a material element relevant to the invention, the public key being for example transmitted to an addressee, the private key staying for example in physical form in the material element, and being called on a temporary basis only when a message that was encoded with the public key needs to be decoded. We can also extract a key (private for example) from a material element relevant to the invention and use another key (public for example) generated by any other means. Other adaptations of the invention to the existing cryptographic methods or protocols can naturally be envisaged. Notably, we can in this way easily ensure the authentication, certification, identification, non-repudiation, confidentiality, integrity checking, proof of non-disclosure, signature, key exchange, time stamping, generating, depositing and managing keys etc. functions currently addressed by said existing protocols.

Whether we use the aforementioned direct or indirect means for protecting, we can subject upstream, that being prior to implementing the combination or the cryptographic and/or steganographic algorithm, the signature and the digital data to a data compression algorithm, or to any other process.

The protection by direct means and the protection by indirect means both allow, if necessary, to protect only a part of the sensitive data, and to implement several levels of access to the original sensitive data. It also appears beneficial that the protection implements several digital signatures issued from the same or different material elements, subsequently allowing to give distinct reading access to the sensitive data, and notably to only parts of this sensitive data. The successive use of several digital signatures and/or in a subsequent manner allows to secure the digital data a various levels of access. The digital signatures are then generated in the subsequent reading phase, according to the level of access authorisation held by the operator.

A device used to implement the method for protecting sensitive data, applicable within the scope of the invention, comprises means for finding a material element selected and detected on the latter, one or several of its structural characteristics, in particular reflecting its complex, chaotic, unique and stable structure connected to a storage and processing unit ensuring:
- a1) the acquiring, shaping/conditioning, digitising and possible encoding according to one or several algorithms of the structural characteristic(s) detected to generate one or several digital signatures obtained from at least one characteristic of a material element, in particular from at least one characteristic reflecting the complex, chaotic, unique and stable character of the structure of the material element,
- b1) the association of the generated digital signature(s) to the sensitive data in digital form to ensure its protection, thus generating protected sensitive data.

An optical sensor will preferably be used for detecting. The device can be connected to means for remote transmission of the protected sensitive data (even on an unsafe channel such as the Internet) and/or the digital signature and/or the structural characteristics.

An important aspect of the invention is that it is applicable as much to data of a set size and invariable with time as to "real time" data of digital signal type variable with time. If the first application mode is easily perceivable, as we combine a delimited and invariable piece of data (digital signature) derived from a material element with a piece of digital data to be protected, it also being delimited and invariable, the second application mode requires greater detail.

In the event that the method according to the invention is implemented to protect the dynamic sensitive data, such as an audio and/or video sequence, it is necessary to use a "dynamic" digital signature. The "dynamic" digital signature can be obtained by repeating a static digital signature or by repeated detection, through the use of one or several sensors, of one or several structural characteristics of a static material element reflecting its unique complex structure.

Another alternative consists in obtaining a "dynamic" digital signature via continuous detection, through the use of one or several sensors, of one or several structural characteristics of a material element in relative movement to the sensor(s). The material element "passes" in front of the sensor(s), in a synchronous or non-synchronous manner with the digital signature to be secured. The relative movement of the material element and of the sensor(s) can also be obtained with the single movement of the sensor(s) or the combined movement of the sensor(s) and of the material element, in different directions and/or at different speeds. In the latter alternative, the material element is, for example, a reel of paper, cardboard or nonwoven, in movement, or paper being manufactured on a paper machine. It is even conceivable to instantaneously combine the digital signature to be protected with the obtained "dynamic" signatures.

In every type of method for protecting/securing data, you then need to be able to read the data which have been protected. The expression "read" is to be understood in the broad sense, it includes all types of decoding, decrypting . . . , rendering at least a part of the original sensitive data accessible and comprehensible.

So, the invention is also related to a method for securing sensitive data comprising the following steps:
- a) one step of protection as defined above, in order to obtain protected sensitive data;
- b) one step of reading the protected sensitive data, allowing to find the sensitive data.

In general, the step of protection is followed by a storing on a data media.

We will now detail the step of reading.

An other purpose of the invention is also a method for reading protected data in which, the reading of protected data is performed in digital form, by applying a digital processing, implementing at least one digital signature obtained from at least one structural characteristic of a material element chosen from among all or part of a fibrous material, plastic, metal, leather, wood, composite material, glass, mineral or crystalline structure. The digital signature is obtained from a characteristic of the material element reflecting its structure, in particular representing the complex, chaotic, unique and stable character of its structure.

All that was said in the section regarding the protecting of sensitive data, in particular, and what relates to the choice of the material element, the obtaining of the structural characteristics and the digital signatures applies to the reading.

Diagrammatically, the reading of protected data will be performed thanks to a digital process substantially corresponding to the digital process inverse of that used to protect it, by using one or several digital signature(s) of the material element that was used to protect it, as reading key(s).

One of the problems is to preserve and transmit the necessary information for reading. This information naturally includes the digital signature(s) used to protect the sensitive data. The preserving can be performed at several levels. Firstly, it is possible to record, in digital form for example, either the structural characteristic(s) that was used to generate the digital signature(s), or the digital signature(s) itself. In this case, there is a dematerialization of the material element that no longer needs to be preserved and can be destroyed. However, it is necessary to manage the security of the preserved digital data perfectly. In this case, the digital signature(s) used for reading precisely correspond to those used for protecting.

Then, it is also possible to preserve the material element that was used to generate the digital signature, which implies finding and protecting the material element for future use. In the latter case, you usually need to be capable of reproducing all the phases implemented to obtain the digital signature used for protecting. That meaning you must:

- take the material element that was used to secure the sensitive data. This material element could have been indexed to the latter, by means of a database, or linked to a part of the original sensitive data (printing of a code, for example),
- extract, acquire one or several structural characteristics of this material element by means of one or several sensors with or without contact with the material element, normally followed by an analogue (optical or electronic, for example) or digital (capture board wired into any given computer or automatic platform) run unit. One or several digital signatures are thus generated, possibly after encoding of the structural characteristics, through applying one or several algorithms, whose nature can vary depending on the function of the type of material element chosen and the targeted application.

The phases implemented in the method for reading preferably use the same operating conditions as those implemented in the method for protecting the data. The capacity for finding or perfectly reproducing one or several given digital signatures from a material element is usually indispensable, in order to properly implement the method for reading. The scale factor, the accuracy of the sensor (filtering), the positioning of the element . . . are parameters that need to be taken into account during the selecting of the structural characteristic to be detected on the material element. Nevertheless, it is conceivable to resort to using check keys or error correcting codes, more generally detection and error correction techniques, allowing to overcome the reading errors. We can also authorise the recovering of the original digital sensitive data depending on the success of a statistical dependence test between the digital signature(s) extracted during the reading and those that were used for securing, for example stored in a database. Consequently, in the event of during reading, the digital signatures are found from the material element, these can be slightly different from those that were used for protection, and so be subjected to check keys, error correcting codes or a statistical dependence test.

We can use yet another means allowing to recuperate the original digital data, despite an imperfect reproduction of the digital signature of the material element during the reading phase. For example, the introduction of redundancy in the original sensitive data prior to the data protecting phase by means of the concerned method of the invention, provides strength to the reading method.

Moreover, it is noticed that in some cases it is even possible to implement one or several digital signatures that are slightly different to those that were used to protect the original data but which issue from the same original, and despite this find the original data otherwise intact, at least its significance. For example, an identity photo that is slightly blurred or with minor defects does not in any way hinder the recognition of the person. Regarding the transport of the information needed for reading, notably including the material element, the structural characteristic in digital form of the digital signature, the invention is also of particular interest: the generating element of the digital signature is of physical origin and can be transported via an entirely distinct channel from the digital channels. If we agree on another secret (generating algorithms of digital signatures, number of useful digital signatures in a more extensive set, command to implement these keys . . . ), the digital information can be directly transmitted, even protected itself by another alternative of the invention, during its transmission.

Prior to implementing the method for protecting, the operator possess the sensitive data in digital form to be secured and a material element. After implementation, the operator possess the secured sensitive data recorded on a data medium, the material element and the original sensitive data. The latter can either be stored away safely for future verification of the integrity of the secured data, for example, or destroyed. That only leaves the material element and the media of the secured sensitive data. The secured sensitive data can only be read by those in possession of the material element and the exact knowledge of the means implemented to generate the digital signature and then to ensure the protection of the data. The reliability of the system is doubly ensured by the safety of the preservation of the material element, and the safety of the secrecy of the details of the method. When digital data has been secured from the analysis of the texture of paper and that only one zone or clearly delimited zones of this paper constitute the material element, then the safety of the method is ensured by preserving the paper and the knowledge of the active zones of this material element. This example illustrates the force of this type of protection of digital data, which allows, on one hand, to preserve the material element that was implemented (without having to disclose the nature) and, on the other hand, to be able to transmit or store, in complete security, the secured data. One part of the system is physically preserved and another part is immaterial and digital.

Of course, an alternative mentioned above is to preserve, not the material element, but the digital signature or the characteristics in digital form for example reflecting its complex, chaotic, unique and stable structure. The latter is then backed up in a permanent and safe manner and can be used directly for reading, the original material element can possibly be destroyed. The advantage here is to obtain the securment by using the complex, chaotic and unique structural properties of the material element, and by preserving the digital images of the latter (dematerialised) to facilitate the implementation of the reading phase. The safety of the storing of the digital characteristics and/or the digital signatures is then critical. It can of course be secured through all the standard means such as cryptography, steganography, physical USB (Universal Serial Bus) key, smart card or other.

The method for reading according to the invention is applied to the protected data in digital form, which undergoes a digital process inverse to that implemented to protect it. Most of the time, it must inversely reproduce the algorithm, process or combination used for protecting, the signature used for the protecting then playing the role of the reading key, in the broad sense of the expression, so that the original sensitive data returns to being at least partially legible. By way of example, we use a reconstruction algorithm, one or several decryption algorithms inverse to those implemented for protecting, the digital signatures being used as decryption keys.

In the case where the reading stage uses the material element to find the necessary digital signature, we will use a device which comprises means for locating a material element selected and detected on the latter, one or several of its structural characteristics, in particular reflecting its complex, chaotic, unique and stable structure, connected to a storing and processing unit, ensuring:
- a2) the acquiring, shaping/conditioning, digitising and possible encoding according to one or several algorithms of the structural characteristic(s) detected to generate one or several digital signatures obtained from at least one structural characteristic of a material element, in particular at least one characteristic reflecting its complex, chaotic, unique and stable structure,
- b2) the reading of the sensitive data protected by implementing a digital process which uses the digital signature(s) generated in stage a2, as reading key(s), and which advantageously corresponds to the digital process substantially inverse to that used to associate the digital signature(s) with the original sensitive data, whilst being protected.

In particular, the storing and processing unit, ensures:
- a2) the digitising and possibly the coding according to one or several algorithms of the structural characteristic(s) detected to generate one or several of the digital signatures
- b2) the reading of the sensitive data protected by implementing a digital process which uses the digital signature(s) generated in stage a2, as reading key(s), and which corresponds to the digital process inverse to that used to associate the digital signature(s) with the original sensitive data, whilst being protected.

We fully understand that the method for protecting and the method for reading can be implemented by the same device.

The protection according to the invention is, for example, implemented to protect the digital sensitive data (telecommunications, music, video, multimedia . . . ), in view of transporting it on not very safe networks and/or in view of controlling/guaranteeing its later use. In this type of application, the dematerialization of the material element as securing key can be very advantageous. Indeed, if we want to secure a digital signal so as to transport it on not very safe networks and/or control and/or guarantee its later use, and all the more so as this reading phase must take place geographically and/or in a time scale that renders the transport of the material element impossible, we can imagine, for example, simultaneously or slightly outphasedly emitting the secured digital signal and the digital structural characteristics of the material element and/or the associated digital signatures the safety of the operation is then ensured by the algorithmic aspect to be implemented in the method for reading and by the intrinsically chaotic nature, and therefore unpredictable, of the material element that we find in its digital structural characteristics and/or the associated digital signatures. We can also imagine two distinct types of data channels transmission: of the secured digital signal on one hand, and the digital characteristics of the material element and/or the associated digital signatures on the other hand.

The data media on which the protected data can be stored also constitutes a major aspect. This media will also and more frequently be used to transmit or transport in the future the protected data. Storing can be permanent or temporary. This media holds the protected data: the data can be printed on a physical media, on paper for example, or recorded on an electronic, magnetic or optic media. Of course the media can hold other data. By way of example, the digital data protected according to the invention can be recorded on magnetic hard drive, magnetic tape, in optical form, holographic memory, engraved on a CD or DVD, on a USB key, flash memory or other, in electronic form on a smart card, but also in printed or engraved form on a material or document. The physical support can be constituted of several materials and contain secured data in different forms. The secured data can also be stored in database form, easily accessible, either directly or via a telecommunications network (Internet for example).

The secured data can be transmitted and received via a telecommunications network or via a physical means of transport.

The media can, moreover, integrate the means for transmitting data or integrate one or multiple elements implemented in data transmission, in particular radio-frequency sensitive elements (active or passive antennas for instance) implemented in a contactless and distant data transmission.

According to an alternative of the invention, the media is a paper, cardboard or nonwoven document. It can notably be of anti-counterfeiting paper (banknotes, cheques, official certificates, tickets . . . ) gathering all or part of the following safeguards: embedded elements (security threads, planchette . . . ), watermarks, holograms, micro perforations, micro printing, different types of printing, chemical anti-forgery reactants . . .

This media can be in the form of a paper, cardboard or nonwoven document, of which all or part corresponds to the material element from which issues the digital signature(s) that was used to protect the sensitive data, partly or completely protected by an external transparent folder (for example lamination, film coating, extrusion or other) of a material acting as a protection against normal external attacks through usage but also preventing the separation of the document and of the folder without destroying the first. A surface application with a transparent resin can also provide protection.

The protected sensitive data is then recorded onto this media, for example via printing. According to an alternative, the protected sensitive data appears in the form of a barcode.

This media can also be in the form of paper, corrugated or flat cardboard or nonwoven transformed into a folder for example, into cardboard packaging, labels, disposable clothes . . .

Some possible forms of secured data media listed below, can additionally intimately integrate all or part of the material element that was used to protect the sensitive data and/or all or part of the original sensitive data in any given form, printed or stored in digital form. The material element will preferably be localised and protected.

In smart card and/or magnetic tape applications, this is particularly advantageous as we place "intelligence" in to the media and connect the material element/media and the secured data in a bi-unique manner. The original data are thus only accessible to the pocessor of the material element. This coupling of original data and the material element additionally allows an implicit verification of the authenticity of the card. The digital sensitive data in clear text on the media also allows to verify the integrity of this data and/or the secured data by straightforward comparison.

The physical media can, in a similar manner, intimately integrate all or part of the material element that was used to implement the protection and/or all or part of the structural characteristic(s) extracted from the material element in whatsoever form and/or all or part of the digital signature(s) of the material element in whatsoever form. Notably, it integrates at least a digital signature obtained from a practically invariable characteristic of a material element reflecting its unique complex structure and preferably in encrypted form.

By way of examples of other media, for which we can verify the authenticity, we can cite:
- a paper card on which are printed, on one hand, the original sensitive data, and on the other hand, the protected sensitive data of which a part corresponds to the paper material element that was used to generate the electronic signature, this element being protected and localised by a plastic film, a paper media of which a part corresponds to the material element, imprisoned in a CD on which the protected data are engraved thanks to a digital signature generated with the paper material element.

Consequently, if the method for reading authorises the successful reading of the sensitive data, it also validates the authentic nature of the digital signature(s) used and/or the material element from which it issues and/or the media of the protected sensitive data.

Moreover, an additional phase in the method for reading, which compares the read data with the sensitive data known to the user, allows to validate the authentic nature of the digital signature(s) implemented, the material element from which it issues and the sensitive data. This aspect is particularly advantageous as the media goes to make identity documents, pass cards . . .

The methods for protecting and reading according to the invention can, of course, be integrated upstream or downstream from a more general application process. In particular, it can be used alone or in combination with other processes for the tracing of products or services, managing of documents, manufacturing of security documents, official certificates, embedded or non-embedded labels, the rendering confidential of physical or electronic mail, the certifying of original paper or electronic documents, electronic payment, electronic signing, to generate bar codes, recorded delivery letters, to monitor letter or parcels, envelops or digital watermarking . . .

Figure 3:
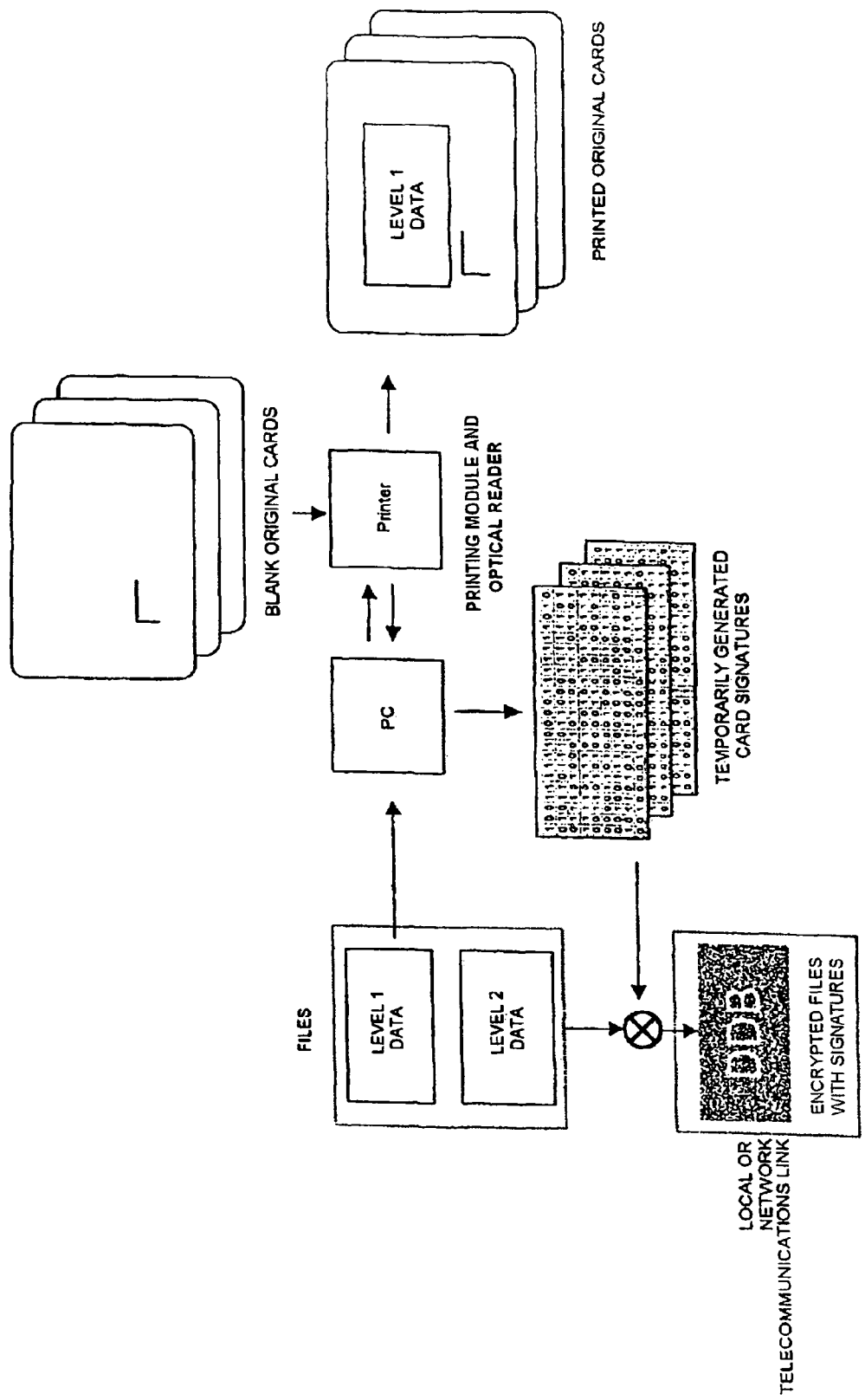
FIGS. 3 and 4 illustrate an embodiment of the invention for protecting and reading and a medium.
Figure 4:
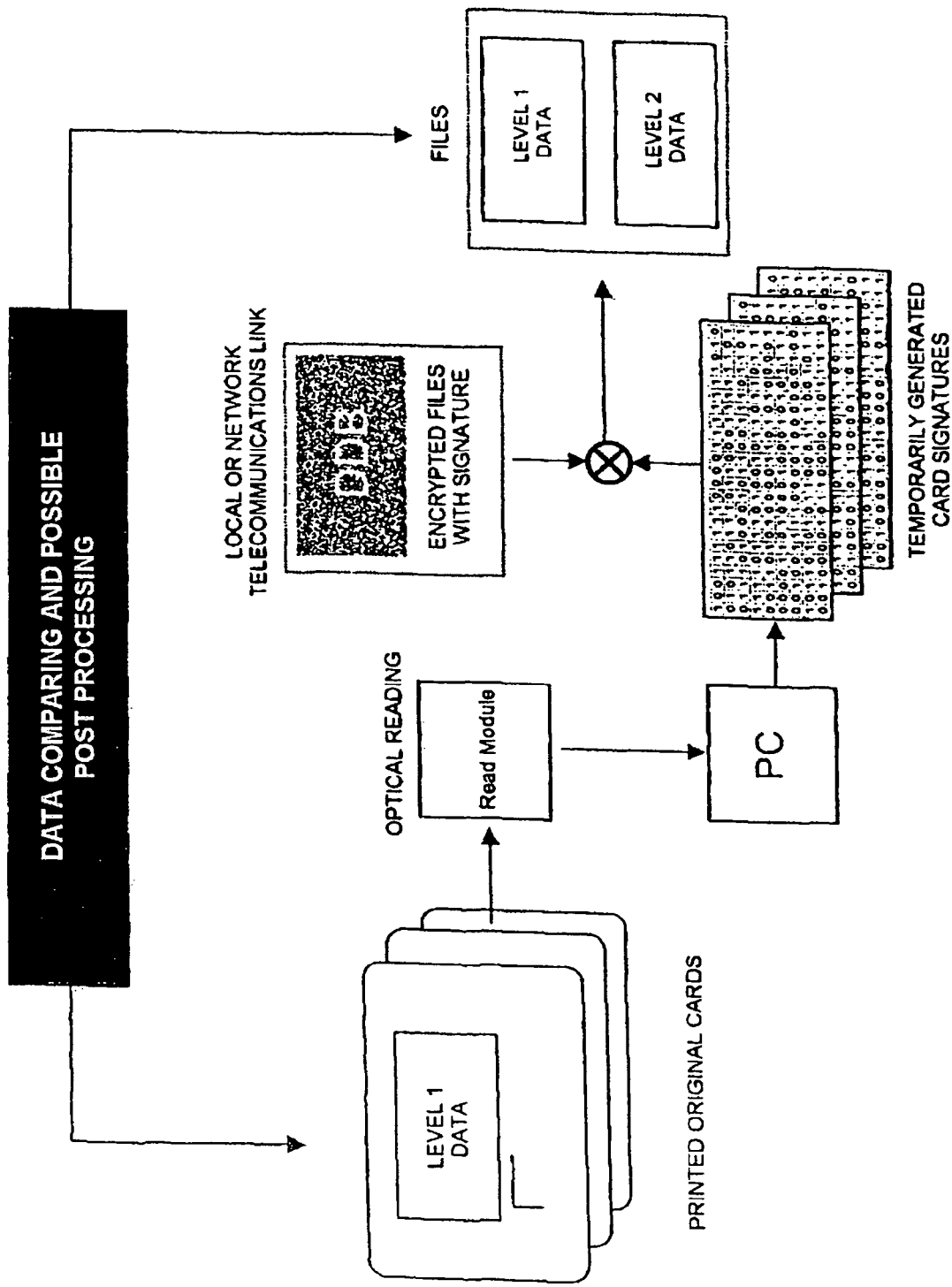

FIGS. 3 and 4 illustrate an embodiment of the methods for protecting and reading according to the invention. In this example, the material element in question is a paper or cardboard card, even a plastic card integrating a paper or cardboard material element whose chaotic structure is accessible via look through.

The writing phase illustrated in FIG. 3 implements the method for protecting, according to the invention, from a set of original blank cards, each integrating a material element generating a digital signature, of the aforementioned type, digital files containing two types of data (level 1 which will be printed on a card and level 2 which will be secured with level 1 for example), a PC with an acquisition card, a printer equipped with an optical reading device of the characteristics reflecting the unique complex structure of the material element, or in another configuration an optical reading device separate from the printer. The digital data (level 1 and level 2) which will be linked to the cards can be partly similar. At the time of placing the card in the printer or the external optical reading device, we print level 1 data on to it, and we extract the structural characteristic(s) in digital form of the material element present, we generate the associated digital signatures, that we temporarily store in the PC, in order to create a combination (direct or indirect) of the digital data (level 1 and level 2) with said signatures. At the end of the writing phase, part of the secured data is printed in intelligible form on the cards, and files containing the digital data (level 1 and level 2) encrypted with the digital signatures extracted from the successive material elements, are stored in a permanent manner in a reference database (with or without card index/secured file). These encrypted files can be transmitted via local link or telecommunications network.

The reading phase illustrated in FIG. 4 implements the method for reading according to the invention. The set of original printed cards, obtained in the writing phase, is analysed using an optical reading device, an acquisition card and a PC, the digital signatures are generated and stored temporarily in the memory of the PC, so as to be able to test said signatures on the secured files present in the reference database. If the tested card allows access to the digital data in level 1 and in level 2 contained in an encrypted file, we then jointly have several pieces of data: on one hand, that the card (key) is authentic, and on the other hand, by comparing the data in level 1 held in the encrypted file to the data in level 1 printed on the card, that if there is identity then the encrypted file and/or the data present on the card has kept its integrity, that meaning it was not modified since the making of the card.

The invention claimed is:

1. A method for reading protected sensitive data comprising:
   acquiring one or more complex, chaotic, unique, and stable structural characteristics of one or more material elements selected from the group consisting of a fibrous material, plastic, metal, leather, wood, composite material, glass, mineral, or a crystalline structure;
   digitizing and encoding the acquired one or more structural characteristics;
   generating one or more digital signatures of the encoded and digitized one or more structural characteristics;
   decrypting, by a processor, at least one or more data using the one or more digital signatures as keys;
   reading the decrypted one or more data.

2. The method for reading protected sensitive data set forth in claim 1, wherein protection of the data implements the data in digital form and at least one digital signature obtained from at least one structural characteristic of a material element chosen from among a fibrous material, plastic, metal, leather, wood, composite material, glass, mineral, and crystalline structure, and in that the protection is performed by subjecting the data in digital form to a encryption process inverse to that used to decrypt the data and which implements one or more digital signatures of the material element that was used to decrypt the data.

3. The method for reading protected sensitive data set forth in claim 1, wherein the one or more digital signatures used as keys are random.

4. The method for reading protected sensitive data set forth in claim 1, wherein the one or more digital signatures used as keys keep the stable, random and complex character representative of the unique and stable structure of the material element.

5. The method for reading protected sensitive data set forth in claim 1, wherein the material element is fully or partly chosen from paper, cardboard or nonwoven.

6. The method for reading protected sensitive data set forth in claim 5, wherein the material element is part of a paper, cardboard or nonwoven, which is covered with a transparent material for stability and protection.

7. The method for reading protected sensitive data set forth in claim 2, wherein-the one or more digital signatures used during the reading correspond to the one or more digital signatures used during the protection.

8. The method for reading protected sensitive data set forth in claim 7, wherein the one or more encoded and digitized structural characteristics or one or more digital signatures implemented during the protection are backed up in a permanent and safe manner, wherein the one or more digital signatures are destroyed.

9. The method for reading protected sensitive data set forth in claim 1, wherein the one or more digital signatures used during the reading are subjected to check keys, error correcting codes, or a statistical dependence test.

10. The method for reading protected sensitive data set forth in claim 1, wherein successful reading of the data validates the authentic nature of the one or more digital signatures used and the material element.

11. The method for reading protected sensitive data set forth in claim 1, further comprising comparing the read data with data known to the user to allow a validation of authenticity of the one or more digital signatures implemented, the material element, and the data.

12. The method for reading protected sensitive data set forth in claim 1, wherein the acquiring step of the one or more structural characteristics of the element is carried by detection using one or more sensors.

13. The method for reading protected sensitive data set forth in claim 12, wherein the detection is performed by an optical or electronic sensor after applying a wave or electromagnetic radiation to the material element.

14. The method for reading protected sensitive data set forth in claim 12, wherein the detection is performed by a contact sensor, the material element acting as a medium for an ultrasonic wave or an electric, thermal, chemical, biological type stress, wherein a behaviour or response from the material element subjected to the wave or the stress is recorded in different orientations.

15. The method for reading protected sensitive data set forth in claim 1, wherein the one or more digital signatures is in a binary form or in a form of a real or complex image or more images in shades of grey.

16. The method for reading protected sensitive data set forth in claim 12, wherein the method implements the digital signature of a material element, issued from paper, cardboard or nonwoven, obtained after detection of interactivity of the material element with visible light, via look through, by using a CCD or CMOS sensor.

17. The method for reading protected sensitive data set forth in claim 1, wherein the decrypting step uses one or more cryptographic algorithms, with the one or more digital signatures acting as decryption keys.

18. The method for reading protected sensitive data set forth in claim 2, wherein the protecting of the data in digital form uses an encrypting step performed by means of a steganographic algorithm, the one or more digital signatures of the material element acting as steganographic keys.

19. The method for reading protected sensitive data set forth in claim 2, wherein the protecting of thedata in digital form uses an encrypting step performed by combining the data with at least one digital signature of at least one material element, rendering both the data in digital form and the digital signature at least partially illegible.

20. The method for reading protected sensitive data set forth in claim 19, wherein the combining step is made from a binary, hexadecimal, ASCII, or alphabetic form of the data in digital form and from the one or more digital signatures of the material element, by jointly or singly applying the principles of permutation, transposition, substitution, iteration, or mathematical properties of modular algebra and numbers theory.

21. The method for reading protected sensitive data set forth in claim 19, wherein the combining step was made by applying a disposable mask .

22. The method for reading protected sensitive data set forth in claim 2 characterised in that the protection of the data in digital form uses an encrypting step performed using the one or more digital signatures as digital envelopes of the data selected from the group comprising compressed, cyphered, and steganographic forms.

23. The method for reading protected sensitive data set forth in claim 1, wherein the one or more structural characteristics are digitized and then sampled with time.

24. The method for reading protected sensitive data set forth in claim 1, wherein the data is dynamic.

25. The method for reading protected sensitive data set forth in claim 24, wherein protection of the data implements one or more digital signatures of the material element and the protection is performed by using a dynamic digital signature obtained by repeating a static digital signature or by repeated detection, through the use of one or more sensors.

26. The method for reading protected sensitive data set forth in claim 24, wherein the one or more digital signatures are one or more dynamic digital signatures obtained by via continuous detection, through the use of one or more sensors wherein the material element is in relative movement to the one or more sensors.

27. The method for reading protected sensitive data set forth in claim 26, wherein the material element is a moving reel of paper, cardboard or nonwoven, or paper being manufactured on a paper machine.

28. The method for reading protected sensitive data set forth in claim 1, wherein —the reading uses one or more digital signatures of one —more material elements to authorize distinct access levels to some parts of the sensitive data.

29. A method for protecting sensitive data comprising:
acquiring one or more complex, chaotic, unique, stable, and physical structural characteristics of one or more material elements selected from the group consisting of a fibrous material, plastic, metal, leather, wood, composite material, glass, mineral, and a crystalline structure;
digitizing and encoding the acquired one or more structural characteristics;
generating one or more digital signatures of the encoded and digitized one or more structural characteristics;
encrypting at least one or more data using the one or more digital signatures as keys;
storing the encrypted one or more data in a computer readable storage device.

30. The method for protecting sensitive data set forth in claim 29, wherein the encrypting step is performed by one of:
using a cryptographic algorithm, the one or more digital signatures of the material element playing the role of one or more cryptographic keys;
using a steganographic algorithm, the one or more digital signatures of the material element playing the role of one or more steganographic keys;
combining at least one digital signature of a material element, rendering both the sensitive data in digital form and the digital signature at least partially illegible, from a binary, hexadecimal, ASCII or alphabetic form by jointly or singly applying the principles of permutation, transposition, substitution, iteration, mask, or mathematical properties of modular algebra and numbers theory; and
using the one or more digital signatures as digital envelopes of the data in one or more of compressed, cyphered, and steganographic form 31. The method for protecting set forth in claim 29, wherein the combining step was made by applying a disposable mask.

32. The method for protecting set forth in claim 29, wherein the one or more digital signatures used as keys are random.

33. The method for protecting set forth in claim 29, wherein the one or more digital signatures used as keys keep the stable, random and complex character representative of the unique and stable structure of the material element.

34. The method for protecting set forth in claim 29, wherein the material element is fully or partly chosen from paper, cardboard or nonwoven.

35. The method for protecting set forth in claim 34, wherein the material element is part of the paper, cardboard, or nonwoven, which is covered with a transparent material for stability and protection.

36. The method for protecting set forth in claim 29, wherein the acquiring step of the one or more structural characteristics of the element is carried by detection using one or more sensors.

37. The method for protecting set forth in claim 36, wherein the detection is performed by an optical or electronic sensor after applying a wave or electromagnetic radiation to the material element.

38. The method for protecting set forth in claim 36, wherein the detection is performed by a contact sensor, the material element acting as a medium for an ultrasonic wave, or an electric, thermal, chemical, biological type stress,
wherein a behaviour or aresponse from the material element subjected to the wave or the stress is recorded in different orientations.

39. The method for protecting set forth in claim 29, wherein the one or more digital signatures are in a binary form or in the form of an image or several images in shades of grey.

40. The method for protecting set forth in claim 29, wherein the method implements the one or more digital signatures of the one or more material elements, issued from paper, cardboard or nonwoven, and obtained after detection of interactivity of the material element with visible light, via look through, by using a CCD or CMOS sensor.

41. The method for protecting set forth in claim 29, wherein the structural characteristics are digitized and then sampled in time.

42. The method for protecting set forth in claim 29, wherein the data is dynamic.

43. The method for protecting set forth in claim 42, wherein the method is performed by means of a dynamic digital signature obtained by repeating a static digital signature or by repeated detection, through the use of one or more sensors, of one or more structural characteristics of a static material element.

44. The method for protecting set forth in claim 43, wherein the one or more digital signatures are one or more dynamic digital signatures obtained by via continuous detection, through the use of one or more sensors, and the one or more structural characteristics of a material element are in relative movement to the one or more sensors.

45. The method for protecting set forth in claim 44, wherein the material element is a moving reel of paper, cardboard or nonwoven, or paper being manufactured on a paper machine.

46. Method for protecting set forth in claim 29, wherein the method implements one or more digital signatures from the same or from different material elements, providing partial or distinct reading access to thedata.

47. A non-transitory computer readable medium containing data protected against direct reading, the data protected by the steps comprising:
acquiring one or more complex, chaotic, unique, stable, and physical structural characteristics of one or more material elements selected from the group consisting of a fibrous material, plastic, metal, leather, wood, composite material, glass, mineral, and a crystalline structure;
digitizing and encoding the acquired one or more structural characteristics;
generating one or more digital signatures of the encoded and digitized one or more structural characteristics;
encrypting at least one or more data using the one or more digital signatures as keys;
storing the encrypted one or more data;
wherein the medium is in a form of a paper, cardboard or nonwoven document 48. The medium set forth in claim 47, wherein the medium holds all or part of the one or more data.

49. The medium set forth in claim 47, wherein the one or more digital signatures used as keys are random.

50. The medium set forth in claim 47, wherein the one or more digital signatures used as keys keep the stable, random and complex character representative of the unique and stable structure of the material element.

51. The medium set forth in claim 47, wherein the one ore more encrypted data are printed on said medium in the form of a barcode.

52. The medium set forth in claim 47, wherein the medium integrates one or more radio-frequency sensitive elements implemented in a contactless and distant data transmission.

53. The medium set forth in claim 47, wherein the medium integrates a chip in which the encrypted one or more data is recorded.

54. The medium of claim 47, wherein the medium comprises at least a part of the material element, which is used to issue the digital signature, the medium protected by an external transparent folder, the external transparent folder incapable of being separated from the medium without destroying the medium.

55. A method for securing sensitive data comprising the following steps:
a) one step of protecting the direct reading of sensitive data comprising:
acquiring one or more complex, chaotic, unique, stable, and physical structural characteristics of one or more material elements selected from the group consisting of a fibrous material, plastic, metal, leather, wood, composite material, glass, mineral, and a crystalline structure;
digitizing and encoding the acquired one or more structural characteristics;
generating one or more digital signatures of the encoded and digitized one or more structural characteristics;
encrypting at least one or more data using the one or more digital signatures as keys;
storing the encrypted one or more data in a non-transitory computer readable medium; and
b) one step of reading the protected sensitive data obtained in step a), thereby allowing finding of the sensitive data.

56. The method for securing set forth in claim 54, wherein the step b) of reading comprises:
acquiring one or more complex, chaotic, unique, and stable structural characteristics of one or more material elements selected from the group consisting of a fibrous material, plastic, metal, leather, wood, composite material, glass, mineral, or a crystalline structure;
digitizing and encoding the acquired one or more structural characteristics;
generating one or more digital signatures of the encoded and digitized one or more structural characteristics;
decrypting at least one or more data using the one or more digital signatures as keys;
reading the decrypted one or more data.

* * * * *